(12) United States Patent
Grbic et al.

(10) Patent No.: US 10,114,120 B2
(45) Date of Patent: Oct. 30, 2018

(54) UNIDIRECTIONAL NEAR-FIELD FOCUSING USING NEAR-FIELD PLATES

(71) Applicant: THE REGENTS OF THE UNIVERSITY OF MICHIGAN, Ann Arbor, MI (US)

(72) Inventors: Anthony Grbic, Ann Arbor, MI (US); Seyedmohammadreza Faghih Imani, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 665 days.

(21) Appl. No.: 14/687,874

(22) Filed: Apr. 15, 2015

(65) Prior Publication Data

US 2017/0038463 A1     Feb. 9, 2017

Related U.S. Application Data

(60) Provisional application No. 61/980,109, filed on Apr. 16, 2014.

(51) Int. Cl.
*G01S 13/00* (2006.01)
*G01S 17/02* (2006.01)
(Continued)

(52) U.S. Cl.
CPC ........... *G01S 17/026* (2013.01); *B60L 11/182* (2013.01); *G01V 3/08* (2013.01); *H01F 38/14* (2013.01); *H04B 5/00* (2013.01)

(58) Field of Classification Search
CPC ......... G01S 17/026; H04B 5/00; H01F 38/14; G01V 3/08; B60L 11/182
See application file for complete search history.

(56) References Cited

U.S. PATENT DOCUMENTS 4,595,899 A    6/1986 Smith et al.
4,955,692 A    9/1990 Merlin et al.
(Continued)

FOREIGN PATENT DOCUMENTS

EP         0660370 A2    6/1995
WO    WO 2008144677 A1 * 11/2008 ............. B82Y 20/00
(Continued)

OTHER PUBLICATIONS

A. Ludwig, C. D. Sarris and G. V. Eleftheriades, "Near-Field Antenna Arrays for Steerable Sub-Wavelength Magnetic-Field Beams," in IEEE Transactions on Antennas and Propagation, vol. 62, No. 7, pp. 3543-3556, Jul. 2014.*
(Continued)

*Primary Examiner* — Marcus E Windrich
(74) *Attorney, Agent, or Firm* — Marshall, Gerstein & Borun LLP (57) ABSTRACT

A near-field plate is a non-periodically patterned surface that can overcome the diffraction limit and confine electromagnetic fields to subwavelength dimensions. By controlling the interference of the electromagnetic fields radiated by the near-field plate with that of a source, the near-field plate can form a subwavelength near-field pattern in a forward direction, while suppressing fields in other directions, such as those reflected. The resulting unidirectional near-field plate may find utility in many applications such as high resolution imaging and probing, high density data storage, biomedical targeting devices, and wireless power transfer.

26 Claims, 7 Drawing Sheets

(51) Int. Cl.
  *B60L 11/18* (2006.01)
  *G01V 3/08* (2006.01)
  *H01F 38/14* (2006.01)
  *H04B 5/00* (2006.01)

(56) References Cited

U.S. PATENT DOCUMENTS

| | | | |
|---|---|---|---|
| 5,910,940 A * | 6/1999 | Guerra | B82Y 10/00 369/112.24 |
| 6,859,114 B2 | 2/2005 | Eleftheriades et al. | |
| 7,777,594 B2 | 8/2010 | Eleftheriades | |
| D636,333 S | 4/2011 | Kulikowski | |
| 8,003,965 B2 | 8/2011 | Grbic et al. | |
| 8,035,255 B2 | 10/2011 | Kurs et al. | |
| 8,324,759 B2 | 12/2012 | Karalis et al. | |
| 8,461,722 B2 | 6/2013 | Kurs et al. | |
| 8,471,410 B2 | 6/2013 | Karalis et al. | |
| 8,497,601 B2 | 7/2013 | Hall et al. | |
| D692,010 S | 10/2013 | Verghese | |
| 8,561,581 B2 | 10/2013 | Taylor | |
| 8,570,128 B1 * | 10/2013 | Dede | H01F 5/00 335/229 |
| 8,598,743 B2 | 12/2013 | Hall et al. | |
| D697,477 S | 1/2014 | Jonas, III | |
| 8,629,578 B2 | 1/2014 | Kurs et al. | |
| 8,669,676 B2 | 3/2014 | Karalis et al. | |
| D705,745 S | 5/2014 | Kurs et al. | |
| 8,723,366 B2 | 5/2014 | Fiorello et al. | |
| 8,729,737 B2 | 5/2014 | Schatz et al. | |
| D709,855 S | 7/2014 | Jonas | |
| 8,875,086 B2 | 10/2014 | Verghese et al. | |
| D722,048 S | 2/2015 | Kurs et al. | |
| 8,947,186 B2 | 2/2015 | Kurs et al. | |
| 8,963,488 B2 | 2/2015 | Campanella et al. | |
| 9,013,068 B2 * | 4/2015 | Ryu | H02J 17/00 307/104 |
| D734,731 S | 7/2015 | Kurs | |
| 9,184,595 B2 | 11/2015 | Kurs et al. | |
| 9,287,607 B2 | 3/2016 | Efe et al. | |
| 9,306,635 B2 | 4/2016 | Kurs et al. | |
| 9,318,898 B2 | 4/2016 | John | |
| 9,343,922 B2 | 5/2016 | McCauley et al. | |
| 9,369,182 B2 | 6/2016 | Kurs et al. | |
| 2002/0100870 A1 * | 8/2002 | Whitehouse | B82Y 30/00 250/281 |
| 2004/0165165 A1 * | 8/2004 | Yun | B82Y 10/00 355/53 |
| 2006/0108509 A1 * | 5/2006 | Frangioni | A61B 5/0059 250/208.1 |
| 2006/0192115 A1 | 8/2006 | Thomas et al. | |
| 2007/0013999 A1 * | 1/2007 | Marks | B82Y 20/00 359/368 |
| 2007/0278604 A1 * | 12/2007 | Minixhofer | G02B 5/1809 257/432 |
| 2009/0230333 A1 | 9/2009 | Eleftheriades | |
| 2009/0303154 A1 * | 12/2009 | Grbic | B82Y 20/00 343/909 |
| 2011/0303824 A1 | 12/2011 | Grbic et al. | |
| 2012/0119698 A1 | 5/2012 | Karalis et al. | |
| 2012/0313449 A1 | 12/2012 | Kurs et al. | |
| 2013/0033118 A1 | 2/2013 | Karalis et al. | |
| 2013/0038147 A1 * | 2/2013 | Dede | H02K 29/03 310/46 |
| 2013/0038402 A1 | 2/2013 | Karalis et al. | |
| 2013/0062966 A1 | 3/2013 | Verghese et al. | |
| 2013/0069441 A1 | 3/2013 | Verghese et al. | |
| 2013/0099587 A1 | 4/2013 | Lou et al. | |
| 2013/0175874 A1 | 7/2013 | Lou et al. | |
| 2013/0200716 A1 | 8/2013 | Kesler et al. | |
| 2013/0249665 A1 | 9/2013 | Liu et al. | |
| 2013/0294468 A1 * | 11/2013 | Sridharan | H01S 3/10007 372/29.02 |
| 2013/0334892 A1 | 12/2013 | Hall et al. | |
| 2014/0021798 A1 | 1/2014 | Kesler et al. | |
| 2014/0035378 A1 | 2/2014 | Kesler et al. | |
| 2014/0049118 A1 | 2/2014 | Karalis et al. | |
| 2014/0091636 A1 | 4/2014 | Ofstein et al. | |
| 2014/0103738 A1 | 4/2014 | Campanella et al. | |
| 2014/0111019 A1 | 4/2014 | Roy et al. | |
| 2014/0139037 A1 | 5/2014 | John et al. | |
| 2014/0142876 A1 | 5/2014 | John et al. | |
| 2014/0159652 A1 | 6/2014 | Hall et al. | |
| 2014/0175892 A1 | 6/2014 | Jonas et al. | |
| 2014/0175898 A1 | 6/2014 | Kurs et al. | |
| 2014/0265617 A1 | 9/2014 | Roy et al. | |
| 2014/0312707 A1 | 10/2014 | Fiorello et al. | |
| 2014/0339910 A1 | 11/2014 | Sealy | |
| 2015/0051750 A1 | 2/2015 | Kurs et al. | |
| 2015/0057496 A1 | 2/2015 | Schatz et al. | |
| 2015/0061404 A1 | 3/2015 | Lamenza et al. | |
| 2015/0123484 A1 | 5/2015 | Kurs et al. | |
| 2015/0194818 A1 | 7/2015 | Karalis et al. | |
| 2015/0222129 A1 | 8/2015 | McCauley et al. | |
| 2015/0233988 A1 | 8/2015 | Katz et al. | |
| 2015/0236546 A1 | 8/2015 | Kesler et al. | |
| 2015/0270719 A1 | 9/2015 | Kurs et al. | |
| 2015/0302984 A1 | 10/2015 | Kurs | |
| 2015/0302985 A1 | 10/2015 | Kurs | |
| 2015/0303706 A1 | 10/2015 | Bronson et al. | |
| 2015/0303710 A1 | 10/2015 | John | |
| 2015/0314984 A1 | 11/2015 | McCarthy et al. | |
| 2015/0323694 A1 | 11/2015 | Roy et al. | |
| 2015/0372495 A1 | 12/2015 | McCauley et al. | |
| 2016/0012967 A1 | 1/2016 | Kurs et al. | |
| 2016/0013661 A1 | 1/2016 | Kurs et al. | |
| 2016/0087458 A1 * | 3/2016 | Grbic | H02J 5/005 307/104 |
| 2017/0038463 A1 * | 2/2017 | Grbic | B60L 11/182 |

FOREIGN PATENT DOCUMENTS

| | | |
|---|---|---|
| WO | WO-2013098795 A1 | 7/2013 |
| WO | WO-2013113017 A1 | 8/2013 |

OTHER PUBLICATIONS

M. I. Kotlyar and S. S. Stafeev, "Subwavelength elliptical focal spot generated by a binary zone plate," 2013 International Conference on Advanced Optoelectronics and Lasers (CAOL 2013), Sudak, 2013, pp. 234-236.*

A. Buffi, P. Nepa and G. Manara, "Performance analysis of near-field focused planar arrays," 2010 URSI International Symposium on Electromagnetic Theory, Berlin, 2010, pp. 340-343.*

S. Xiao, M. Migliaccio, J. T. Camp, C. E. Baum and K. H. Schoenbach, "Focusing pulsed electromagnetic radiation in the near field," 2009 IEEE Pulsed Power Conference, Washington, DC, 2009, pp. 495-498.*

Grbic, et al., "Near-Field Plates: Metamaterial Surfaces/Arrays for Subwavelength Focusing and Probing," Proceedings of the IEEE, 99(10):1806-1815 (2011).

Imani, et al., "A unidirectional subwavelength focusing near-field plate," Journal of Applied Physics 115:044904-1 to 044904-6 (2014).

Imani, et al., "An Experimental Concentric Near-Field Plate," IEEE Transactions of Microwave Theory and Techniques, 58(12):3982-3988 (2010).

Imani, et al., "Near-Field Focusing With a Corrugated Surface," IEEE Antennas and Wireless Propagation Letters, 8:421-424 (2009).

Imani, et al., "Planar Near-Field Plates," IEEE Transactions on Antennas and Propagation 61(11):5425-5434 (2013).

Imani, et al., "Subwavelength Focusing with a Corrugated Metallic Plate," IEEE 4 pages (2009).

Imani, et al., "Unidirectional wireless power transfer using near-field plates," Journal of Applied Physics 117:184903-1 to 184903-12 (2015).

Markley, et al. "Two-dimensional subwavelength-focused imaging using a near-field probe at a λ/4 working distance," Journal of Applied Physics 107:093102-1 to 093102-5 (2010).

(56) References Cited

OTHER PUBLICATIONS

Yaghjian, et al., "Electrically small suergain end-fire arrays", Radio Science, vol. 43, RS3002, 2008.
Grbic, et al., "Near-Field Plates: Subdiffraction Focusing with Patterned Surfaces", www.sciencemag.org, Science, vol. 320, Apr. 25, 2008.
R. Merlin, "Radiationless Electromagnetic Interference: Evanescent-Field Lenses and Perfect Focusing", www.sciencemag.org, Science, vol. 317, Aug. 17, 2007.
J. B. Pendry, "Negative Refraction Makes a Perfect Lens", Physical Review Letters, vol. 85, No. 18, Oct. 30, 2000.
Mohammadreza F. Imani, et al., "An analytical investigation of near-field plates", www.sciencedirect.com, Mar. 19, 2010.
Nader Engheta, et al., "Circuit Elements at Optical Frequencies: Nanoinductors, Nanocapacitors, and Nanoresistors", Physical Review Letters, The American Physical Society, Aug. 26, 2005.
Mohammadreza F. Imani, et al., "Generating Evanescent Bessel Beams Using Near-Field Plates", IEEE Transactions on Antennas and Propagation, vol. 60, No. 7, Jul. 2012.
Mohammadreza F. Imani, et al., "Tailoring near-field patterns with concentrically corrugated plates", AIP Applied Physics Letters, 2009.
Tavakol Pakizeh et al., "Unidirectional Ultracompact Optical Nanoantennas", Nano Letters, 2009, vol. 9, No. 6.
Grbic, et al., "Near-Field Focusing Plates and Their Design", IEEE Transactions on Antennas and Propagation, 56 (10):3159-3165 (2008).
Wong, et al., "Metallic transmission screen for sub-wavlength focusing", Electronics Letters, 43(25):2 pages (2007).
Fang, et al., "Sub-Diffraction-Limited Optical Imaging with a Silver Superlens", Science 308:534-537 (2005).
Grbic, et al., "Overcoming the Diffraction Limit with a Planar Left-Handed Transmission-Line Lens", Phys. Rev. Lett. 92:117403-01-117403-4 (2004).
Grbic, et al., "Practical Limitations of Subwavelength Resolution Using Negative-Refractive-Index Transmission-Line Lenses", IEEE Trans. on Antennas and Propagation, 53(10): 3201-3209 (2005).
Kurs, et al., "Wireless Power Transfer via Strongly Coupled Magnetic Resonances", Science, 317:83-85 (2007).
Melville, et al., "Super-Resolution Imaging Through a Planar Silver Layer", Optics Express, 13(6):2127-2134 (2005).
Merlin, "Analytical Soultion of the Almost-Perfect-Lens Problem", Appl. Phys. Lett. 84:1290-1292 (2004).
Mesa, et al., "Three-Dimensional Superresolution in Metamaterial Slab Lenses: Experiment and Theory", Physical Review B, 72:235117-1-235117-6 (2005).
Milton, et al., "A proof of superlensing in the quasistatic regime, and limitations of superlenses in this regime due to anomalous localized resonance", Proc. Royal Soc. A, 461:3999-4034 (2005).
Pendry, "Negative Refraction makes a Perfect Lens", Phys. Rev. Lett. 85:3966-3969 (2000).
Shelby et al., "Experimental Verification of a Negative Index of Refraction", Science 292:77-79 (2001).
Smith, et al., "Limitations on Subdiffraction Imaging with a Negative Refractive Index Slab", Applied Physics Letters, 82:1506-1508 (2003).

* cited by examiner

UNIDIRECTIONAL NEAR-FIELD FOCUSING USING NEAR-FIELD PLATES

CROSS-REFERENCE TO RELATED APPLICATION

This application claims priority to U.S. Provisional Application No. 61/980,109, entitled "Unidirectional Near-Field Focusing using Near-Field Plates," filed Apr. 16, 2014, which is hereby incorporated herein in its entirety.

STATEMENT OF GOVERNMENTAL INTEREST

This invention was made with government support under EECCS0747623 awarded by the National Science Foundation and support under FA9550-09-1-0696 awarded by the U.S. Air Force/OSR. The Government has certain rights in the invention.

FIELD OF THE DISCLOSURE

The present disclosure relates to techniques for manipulating the electromagnetic near field and, more particularly, to techniques for unidirectional subwavelength near-field focusing using near-field plates.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An electromagnetic beam with subwavelength beamwidth and low sidelobes is important to the operation of a wide array of electromagnetic devices. High resolution probes, sensors and imaging systems, high density data storage devices, lithography systems, biomedical targeting devices, and wireless power transfer systems are a few examples of such devices.

Although subwavelength electromagnetic confinement is necessary for these devices, electromagnetic confinement can only be obtained at extremely close distances, due to the diffraction limit. Stated differently, such confinement is only possible at extremely close distances where evanescent components exist. Such confinement requirement is difficult to meet in many applications and limiting for many devices. For example, a subwavelength probe placed in close proximity of a biomedical sample can distort both the sample and the measurement results. As a result, there is growing interest in a method that can overcome the diffraction limit at extended operating distances.

Over a decade ago, metamaterial superlenses were proposed as a possible solution by J. B. Pendry, *Phys. Rev. Lett.*, 85, 3966, 2000. Metamaterial superlenses can enhance and recover the evanescent spectrum to overcome the diffraction limit over an extended range. Accordingly, they held great promise for improving the performance of near-field devices and their proposal was followed by numerous publications. Several metamaterial superlenses were experimentally demonstrated and their ability to overcome the diffraction limit and obtain super-resolution was verified. However, the proposed metamaterial superlenses were limited by loss, narrow frequency bands of operation, polarization dependence, and fabrication challenges.

More recently, an alternative method to overcome the diffraction limit has been proposed, which relies on the interference of highly oscillatory electromagnetic fields to form subwavelength patterns as discussed by R. Merlin, *Science*, 317, 927, 2007 and U.S. Pat. No. 8,003,965. Such highly oscillatory evanescent fields are realized using near-field plates (NFPs). NFPs are non-periodically patterned surfaces, which are designed to form a prescribed subwavelength focal pattern at a specified focal plane. NFPs have demonstrated several advantages over metamaterial superlenses. Firstly, NFPs are patterned surfaces or arrays which are much simpler to fabricate compared to volumetric metamaterial superlenses. Secondly, NFPs have been shown to be robust to practical losses. Thirdly, NFPs allow one to stipulate the subwavelength near-field focal pattern, a unique feature not offered by metamaterial superlenses. Fourthly, the design of NFPs is scalable with frequency. For example, NFPs have been pursued from kilohertz to optical frequencies.

While previous NFPs have demonstrated extreme field tailoring capability to form subwavelength focal patterns, their performance was limited by undesired fields in directions other than the direction of the subwavelength focus or field maximum. This issue can limit the utility of NFPs in practical applications. For example, an NFP which is used as a probe to detect objects in its focal plane may couple to objects in locations other than the focal plane. Thus, it is desirable to have an NFP that concentrates radiation from a source into subwavelength dimensions without reflection. In other words, the NFP should form a "unidirectional" subwavelength near-field pattern.

SUMMARY

The present techniques allow for the design of an NFP that can form a unidirectional subwavelength near-field pattern. Specifically, the NFP forms a prescribed subwavelength focal pattern with significantly reduced electromagnetic field in directions other than the desired focal pattern. As a result, the NFP proposed here overcomes numerous obstacles for incorporating the use of NFPs in practical applications.

In an example, a method for unidirectional subwavelength focusing and near-field manipulation using near-field plates comprises: generating a source field pattern from an excitation source at a focal plane; generating a subwavelength field pattern from a near-field plate when the near-field plate is excited by the excitation source, the near-field plate being at a distance, d, from the excitation source; forming a desired field pattern at the focal plane from the subwavelength field pattern and the source field pattern, the focal plane being at a distance, L, from the excitation source; and configuring the desired field pattern to be a unidirectional subwavelength field pattern in a desired direction by increasing the amplitude of the desired field pattern in the desired direction.

In another example, an apparatus for unidirectional subwavelength near-field focusing comprises: an excitation source generating a source field pattern and a near-field plate generating a subwavelength field pattern when excited by the excitation source; where after traversing a near-field distance, L, the source field pattern and the subwavelength field pattern form a desired field pattern at a focal plane, and where the desired field pattern is a unidirectional subwavelength field pattern when the amplitude of the subwavelength field pattern is increased.

BRIEF DESCRIPTION OF THE DRAWINGS

For a more complete understanding of the disclosure, reference should be made to the following detailed description and accompanying drawing figures, in which like reference numerals identify like elements in the figures, and in which.

While the disclosed methods and apparatus are susceptible to embodiments in various forms, there are illustrated in the drawing (and will hereafter be described) specific embodiments of the invention, with the understanding that the disclosure is intended to be illustrative, and is not intended to limit the invention to the specific embodiments described and illustrated herein.

DETAILED DESCRIPTION

Near-field plates or NFPs are used to generate extreme electromagnetic confinement. Typically, NFPs are designed to form a prescribed subwavelength electromagnetic focal pattern when excited by a specific source. However, previous NFP designs exhibit pronounced field in undesired directions (e.g., back radiation), thereby limiting their utility in practice. The present techniques allow for the design of an NFP with a unidirectional subwavelength near-field pattern. Unidirectionality is achieved via adjustment of the field amplitude at the focal plane of the NFP. To produce a larger field amplitude at the focal plane (forward direction), the electromagnetic field radiated by the NFP needs to interfere constructively with the field radiated from the source in the desired forward direction, but destructively in other unwanted directions. This phenomenon can be better explained by considering the NFP as current elements with an overall current that is equal to the sum of the currents induced on the NFP. Thus, if the overall current of the NFP has a negative phase and a magnitude close to the current from the source, then a desired unidirectional pattern can be formed.

Generally speaking, NFPs may be in the form of planar structures that focus electromagnetic radiation to spots or lines. These planar structures act as impedance sheets possessing a non-periodically modulated surface impedance (capacitive or inductive reactance), where the modulated surface impedance sets up a highly oscillatory electromagnetic field that converges at the focal plane of the planar structures. The NFPs may be directly excited or illuminated or excited by elementary electromagnetic sources such as plane waves, cylindrical sources, finite sources, etc.

Figure 1:
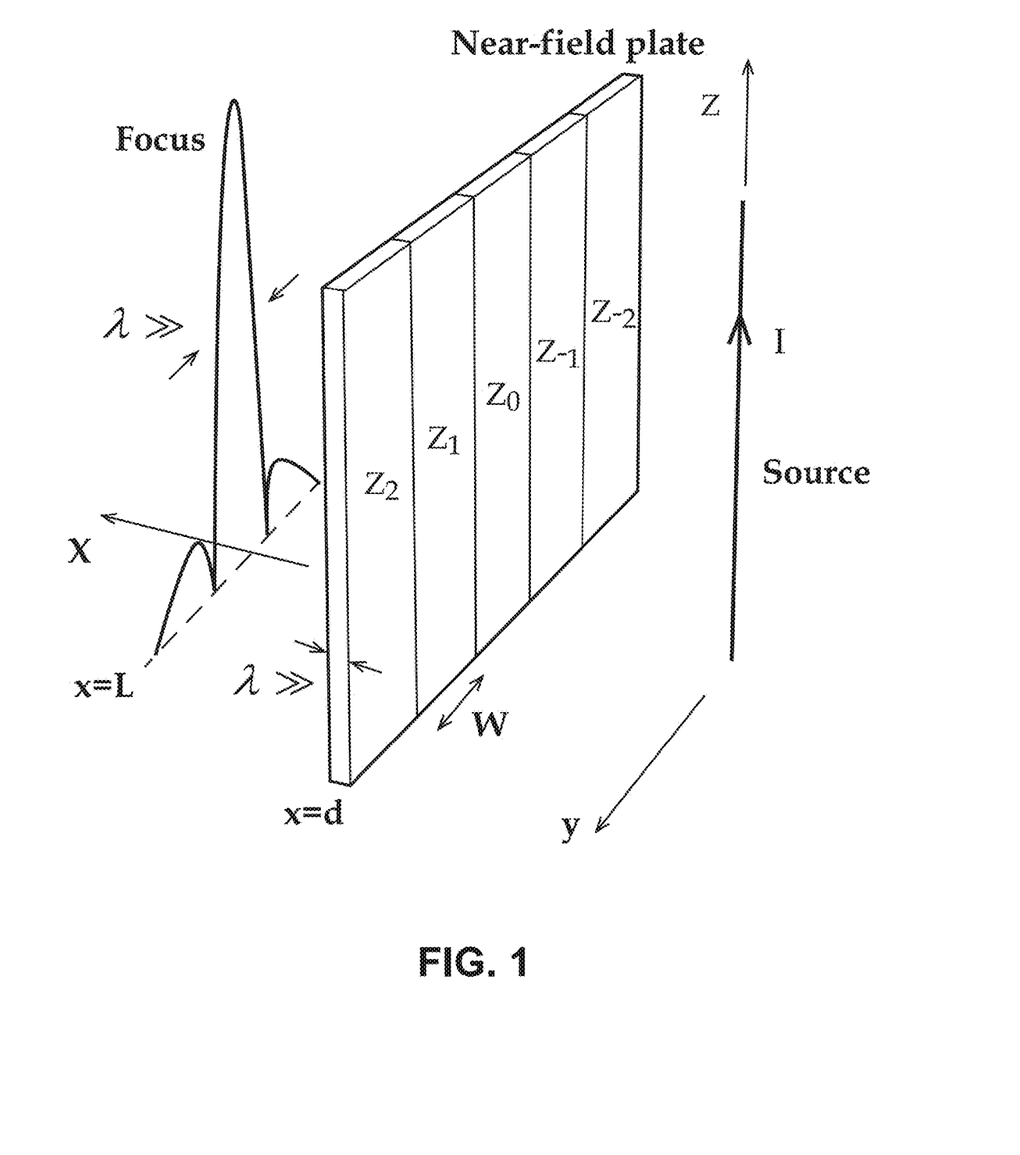
FIG. 1 illustrates an example NFP configuration that includes non-periodically modulated surface impedance strips.

FIG. 1 illustrates an example NFP configuration which can be used to form a unidirectional subwavelength near-field pattern. As shown in the embodiment of FIG. 1, the NFP configuration includes a plate with 2N+1 elements each having a width w and a surface impedance $Z_n$, where $n=-N \ldots +N$. In this manner, the example NFP of FIG. 1 comprises a plurality of non-periodically modulated surface impedance elements. In an embodiment, subwavelength metallic or dielectric patterning may be used to realize the plurality of non-periodically surface impedance elements.

In some embodiments, the NFP configuration may include shapes other than the rectangular elements shown in FIG. 1. For example, the NFP configuration may include elements of various shapes and sizes, including but not limited to circular shaped elements, circular ring shaped elements, arc-shaped elements, U-shaped elements, elliptical shaped elements, elliptical ring shaped elements, L-shaped elements, T-shaped elements, cross-shaped elements, trapezoidal shaped elements, anisotropic elements, etc. Moreover, the elements of the different NFP configurations may be arranged in a regular or irregular lattice, for example.

In FIG. 1, the example near-field plate is located at x=d and is excited by a line source at the origin with a current of I. Both the plate and the line source are assumed to be infinite in the z direction. To form the unidirectional subwavelength near-field pattern, the impedances $Z_n$ of the plate must be determined such that the plate and line source form a desired subwavelength focus, $E_z^{focal}$, at x=L. An example of a desired focal pattern may be:

$$E_z^{focal}(y_n) = jM|E_{inc}(x=L, y=0)|f(y_n) \quad (1)$$

where M is an amplification factor, $|E_{inc}(x=L,y=0)|$ is the maximum of the field incident from the line source at the focal plane, and $f(y_n)$ is the desired subwavelength pattern. The pattern is multiplied by a complex number (in this case the imaginary number j) to ensure that the impedance elements are predominantly reactive.

The goal of the design procedure is to find the impedances $Z_n$ of an NFP that form a prescribed focal pattern $E_z^{focal}$. To accomplish this, the current densities $K_n$ on the surface of the plate that generate the desired focal pattern $E_z^{focal}$ needs to be determined. The current densities $K_n$ can be related to $E_z^{focal}$ by an electric field integral equation, which can be discretized and represented by the following matrix equation:

$$\frac{-kZ_0}{4} \sum_{m=-N}^{N} K_m w H_0^2(k\rho_{mn}) + E_{inc}(x=L, y_n) = E_z^{focal}(y_n) \quad (2)$$

where k is the free space wavenumber, $Z_0=120\pi$ is the free space impedance, $H_0^2$ is the zero-order Hankel function of the second kind, and $E_{inc}(x=L,y_n)$ is the incident field from the line source at the focal plane, sampled at $y_n=nw$. In Equation (2), the width of the surface impedance elements w is assumed to be electrically small. Therefore, the field radiated by each element can be approximated by a line source with current $K_m w$ located at $y_m=mw$ and at a distance $\rho_{mn}=\sqrt{(y_n-y_m)^2+(L-d)^2}$ from the observation point $y_n$. The incident electric field $E_{inc}$ due to the source can be computed using following equation:

$$E_{inc}(x, y) = \frac{-kZ_0}{4} I H_0^2(k\sqrt{x^2+y^2}) \quad (3)$$

where I is the amplitude of the line current source. Equation (2) can now be solved to find the required current densities $K_n$. Once $K_n$ are known, they can be used to find the field at the surface of the plate. The ratios of the fields at the surface of the plate to the current densities are then taken to find the required impedances $Z_n$.

Equation (1) allows one to design an NFP by stipulating both the spatial distribution of the focal pattern through f(y) and the amplitude of the focal pattern through M. Earlier works primarily focused on forming subwavelength focal patterns with various spatial distributions by modifying f(y). As such, NFPs have been designed to generate a subwavelength sinc function as discussed by A. Grbic, L. Jiang, and R. Merlin, *Science,* 320, 511, 2008, an Airy pattern as discussed by M. F. Imani and A. Grbic, *AppL Phys. Lett.,* 95, 111107, 2009, and Bessel focal patterns as discussed by M. F. Imani and A. Grbic, *IEEE Trans. Antennas and Propag.,* 60, 3155, 2012. While these works confirmed the field tailoring capabilities of NFPs, they did not explicitly explore adjusting the amplitude of the generated focal patterns.

The present techniques focus on manipulating the near-field by varying the amplification factor, M. The amplification factor can be chosen carefully such that the NFP interferes constructively with the field due to the line source in the forward direction and destructively in other directions. The mechanism behind creating unidirectional field patterns can be understood by considering antenna array theory, in which the NFP is approximated as a line source with overall current $I_{NFP}$ that is equal to the sum of the currents induced on the NFP. Based on antenna array theory, the phase of $I_{NFP}$ should be negative and its magnitude should be close to |I| in order to form a unidirectional pattern. To achieve these conditions, the currents on the NFP relative to that of the source are adjusted by varying M.

The two element antenna array discussed above resembles, for example, the end-fire superdirective arrays discussed by A. D. Yaghjian, T. H. O'Donnell, E. E. Altshuler, and S. R. Best, *Radio Science,* 43, 2008, or the unidirectional ultracompact optical antennas discussed by T. Pakizeh and M. Kall, *Nano Letters,* 9, 2343, 2009. However, the objective of these earlier works is to form a superdirective far-field pattern while the goal here is to form a unidirectional subwavelength focus in the near-field.

In order to demonstrate how the near-field formed by the NFP can be controlled by changing M, three example NFPs are designed and studied with different values of M. The plates of each of the designed NFPs comprise 5 elements. Each plate is designed to operate at f=1 GHz ($\lambda$=300 mn). The width of the elements is selected to be w=15 mm=$\lambda$/20, which results in plates that are $\lambda$/4 wide. The plates are located at d=10 mm=$\lambda$/30 and the focal plane is at L=20 mm=$\lambda$/15. The amplitude of the line source with current I is arbitrarily set to 1 A. The subwavelength focal pattern is selected to be a Bessel pattern truncated by a Gaussian function such that:

$$f(y_n)=\exp(-y_n^2/2\sigma^2)J_0(qy_n) \quad (4)$$

where $\sigma$=19 mm determines the full-width at half-maximum (FWHM) of the Gaussian truncation, $J_0$ is the zeroth order Bessel function, and q=3k determines the beamwidth of the Bessel function. The plates are designed for amplification factors of M=0.3, M=1.2, and M=2.1. The corresponding surface impedances are listed below in Table 1.

TABLE 1

| index | M = 0.3 | M = 1.2 | M = 2.1 |
|---|---|---|---|
| 0 | 0.73−0.66j | 0.29−40.80j | −0.05−46.59j |
| 1 | 2.88−31.76j | −1.40−116.86j | −15.36−180.20j |
| 2 | −7.98−28.92j | −2.01−19.49j | −1.88−18.54j |

The designed NFPs are simulated using a commercial electromagnetic solver. For the purpose of simulation, the designed NFPs and the corresponding line sources are placed between two horizontal metallic plates of a parallel plate waveguide which are at z=0 and z=H=15 mm planes. According to image theory, the metallic plates of the waveguide accurately model the structure shown in FIG. 1, which is infinite and invariant in the z direction. The real parts of the surface impedances listed in Table 1 are neglected and their reactive parts are realized using $$C_n = \frac{1}{\omega H/W\, Imag(Z_n)},$$

capacitances computed using as discussed by A. Grbic, L. Jiang, and R. Merlin, *Science,* 320, 511, 2008, where $\omega$ is the angular frequency. In practice, such capacitive surface impedances can be realized using interdigitated capacitors at microwave frequencies as discussed by A. Grbic, L. Jiang, and R. Merlin, *Science,* 320, 511, 2008, or dielectric nano-circuit elements as discussed by N. Engheta, A. Salandrino, and A. Alù, *Phys. Rev. Lett.,* 95, 095504, 2005 at optical frequencies. For simulation purposes, the surface impedance boundaries are used because interdigitated capacitors are computationally intensive to simulate. The surface impedances are assumed to be lossy with a conservative quality factor of Q=100.

Figure 2:
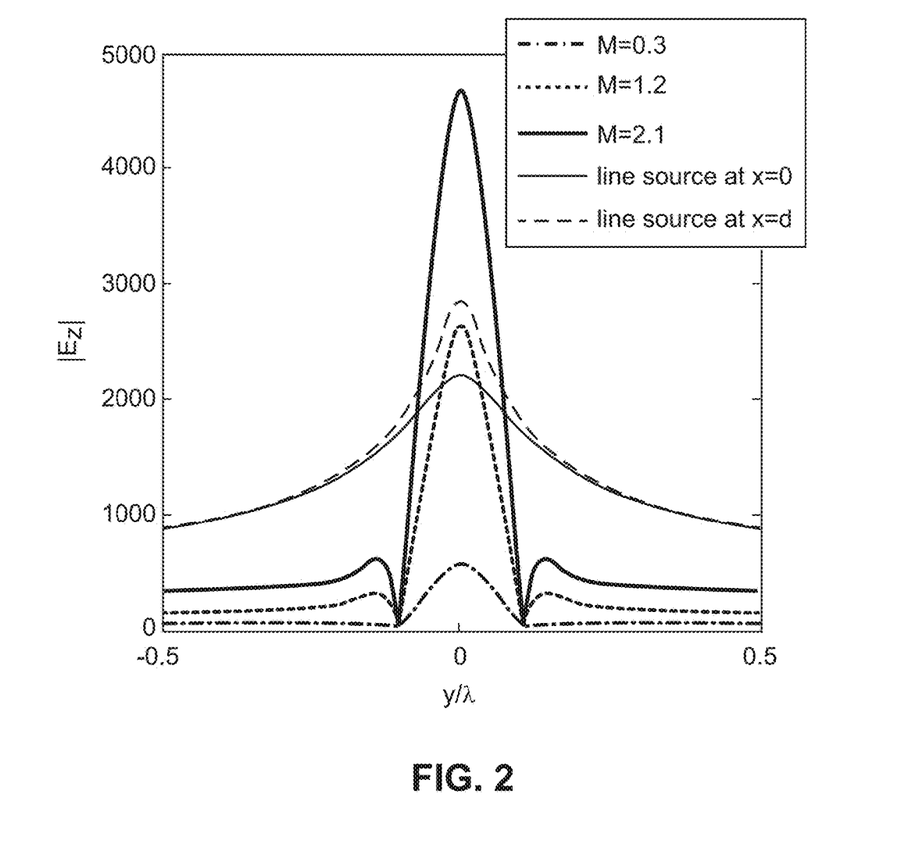
FIG. 2 illustrates focal patterns produced by NFPs with various amplification factors.

The simulated focal patterns for the designed NFPs, for some examples, are shown in FIG. 2. For comparison purposes, the pattern due to the line source alone is also depicted. The designed NFPs produce focal patterns with much narrower beamwidth when compared to the line source alone. Specifically, the FWHM of the focal pattern produced by the designed NFPs is 0.125$\lambda$, whereas that of the line source alone is 5 times wider at 0.623$\lambda$. While the three designed NFPs produce focal patterns with similar subwavelength beamwidths, their field amplitude is different due to the different amplification factors. To further highlight the ability of the NFP to concentrate the electromagnetic field, the pattern due to the line source when it is moved to the location of the NFP (x=d) is also depicted in FIG. 2. The beamwidth of this pattern is still wider than that of NFPs. Specifically, its FWHM is 0.361$\lambda$, which is 2.89 times wider than that of the NFPs.

Figure 3A:
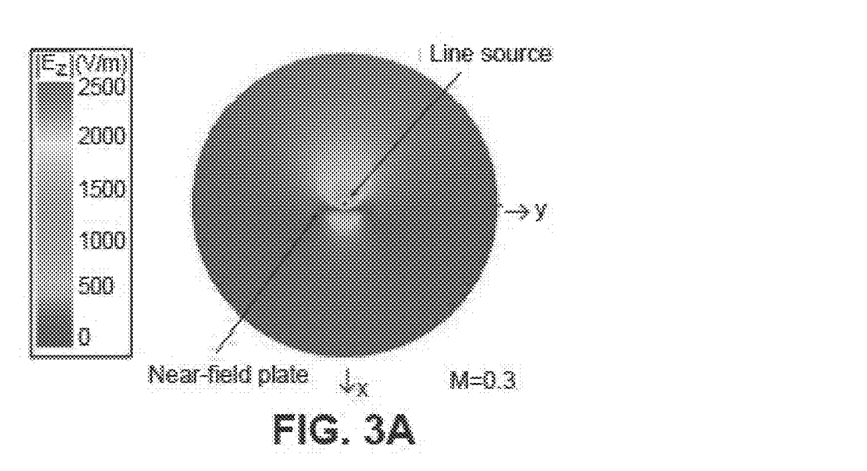
FIGS. 3A-3C illustrate two-dimensional contours of near-field patterns formed by NFPs with various amplification factors.
Figure 3B:
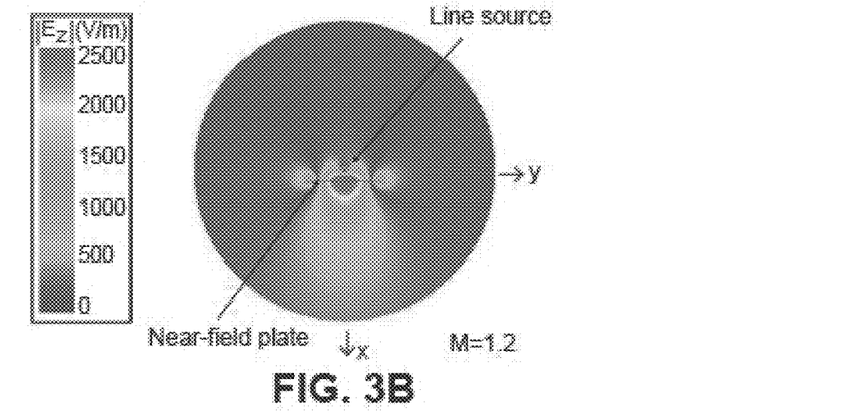
Figure 3C:
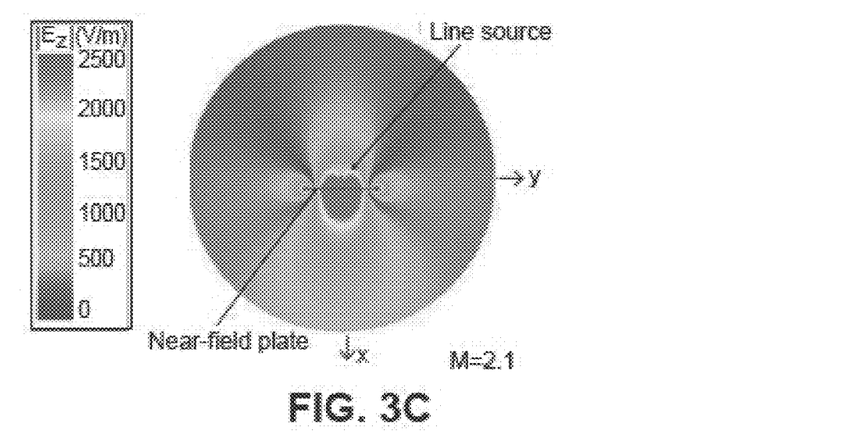

FIG. 3 (FIGS. 3A-3C) illustrates the evolution of the near-field patterns formed by the three designed NFPs as the amplification factor, M, is increased. FIG. 3 plots the two-dimensional contours of the simulated $|E_z|$ patterns formed by the three NFPs. In FIG. 3A, the near-field pattern formed by the NFP with an M=0.3 is shown. This NFP exhibits pronounced reflection similar to earlier NFP designs discussed by M. F. Imani and A. Grbic, *Metamaterials,* 4, 104, 2010.

As the amplification factor is increased, more field is directed in the x>0 direction while the field emitted in other directions is reduced. This can be seen in FIG. 3B and FIG. 3C, where the unidirectional near-field patterns for the NFPs with M=1.2 and M=2.1 are shown, respectively. This phenomenon is in fact similar to that observed in Yagi-Uda antennas, where the far-field radiation is unidirectional. In Yagi-Uda antennas, a parasitic element directs the radiation emitted by an elementary antenna to form a unidirectional far-field pattern. In a similar fashion, an NFP acts as a director element to form a unidirectional subwavelength (directive) near-field pattern.

The variations in the near-field patterns formed by the NFPs in FIG. 3 can also be explained by examining the overall current, $I_{NFP}$, induced on the NFP for different amplification factors, M, as listed in Table 2.

TABLE 2

|  | M = 0.3 | M = 1.2 | M = 2.1 |
|---|---|---|---|
| $I_{NFP}$ | 0.96 ∠ 176 | 0.99 ∠ −169 | 1.06 ∠ −156 |

As mentioned earlier, a negative phase of $I_{NFP}$ (a phase lagging the excitation source) results in a unidirectional pattern. In Table 2, the phase of $I_{NFP}$ is positive for M=0.3, which corresponds to the pronounced reflection seen in FIG. 3A. As M is increased, the phase of $I_{NFP}$ changes. In fact, it can be shown that the phase flips around M=0.55. Above this value of M, the phase of $I_{NFP}$ is negative (see Table 2) and a unidirectional pattern is formed as can be seen in FIG. 3B and FIG. 3C.

Figure 4A:
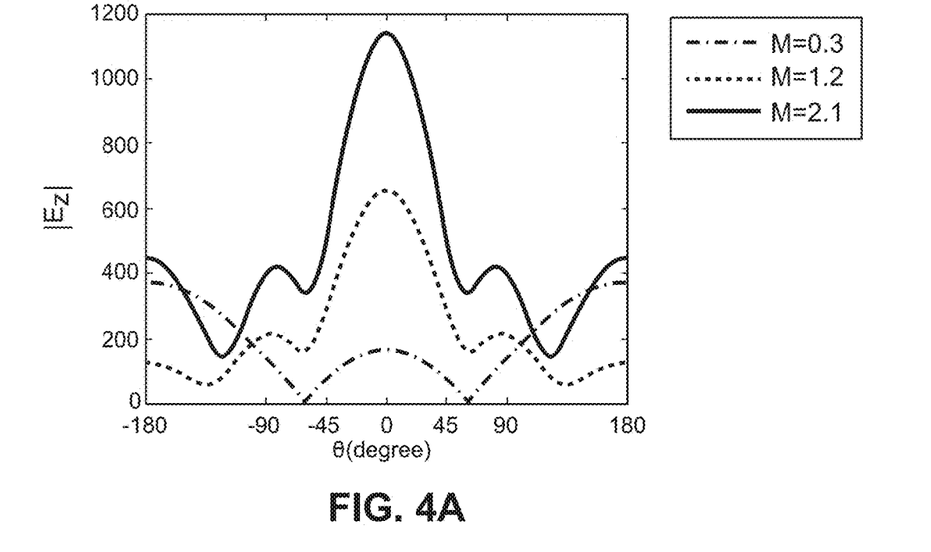
FIGS. 4A and 4B illustrate plots of the near-field patterns produced by NFPs with various amplification factors on a circle centered at the origin.

FIG. 4A illustrates the simulated $|E_z|$ patterns formed by the three NFPs as plotted on a circle of radius 75 mm=$\lambda/4$ centered at the origin. As M is increased from 0.3 to 1.2, the field amplitude at θ=0 increases while the field amplitude in other directions is suppressed. By further increasing M from 1.2 to 2.1, the field amplitude in all directions increases. However, this increase is not uniform for all directions. For example, the ratio of the field amplitude in the forward direction (θ=0) over the backward direction (θ=180) is 5.2 for M=1.2. It reduces to 2.55 for M=2.1. Therefore, any further increase in M does not necessarily improve the unidirectionality of the formed near-field pattern.

Figure 4B:
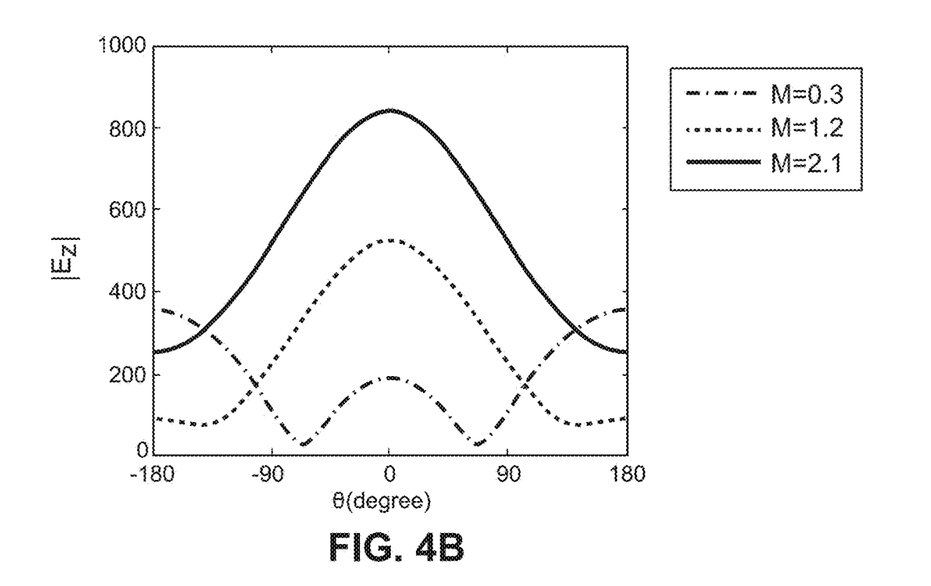

To further illustrate how $I_{NFP}$ listed in Table 2 can be used to explain the near-field pattern formed by the three NFPs, the $|E_z|$ patterns formed by the three $I_{NFP}$ listed in Table 2 and the current source have also been computed (on the same circle as FIG. 4A). The results are shown in FIG. 4B. As one can see, the pattern formed by $I_{NFP}$ corresponding to M=0.3 exhibits significant reflections. However, the other two current values corresponding to M=1.2 and M=2.1 predict unidirectional patterns. The similarity between the predictions of FIG. 4B and FIG. 4A clearly demonstrate how $I_{NFP}$ can be used to explain the formation of the unidirectional near-field. It should be noted $I_{NFP}$ is an approximation of the currents formed on the NFP and the small differences between the FIG. 4A and FIG. 4B are expected.

A closer look at the impedance values in Table 1 reveals another aspect. As M is increased, the real part of the impedance elements becomes negative. Negative real impedance indicates gain which cannot be realized using passive elements. This trend is in fact expected since increasing the amplification factor requires larger field amplitude at the focal plane. When the field amplitude becomes too large (e.g., when M=10), it can only be achieved by using active elements that amplify the field since passive resonant amplification is limited due to losses. Therefore, large amplification factors of M are not physically possible using solely passive elements. However, when the negative real part of the impedances are negligible compared to their imaginary part (as it is the case for M=2.1), the designed NFPs can be approximated using passive reactive impedances.

The unidirectional subwavelength focus created by the designed NFPs may find numerous applications. In particular, it can be used to increase the sensitivity and resolution of imaging and probing instruments. To demonstrate the potential of the designed NFPs as highly sensitive probes with subwavelength resolutions, the designed NFPs are simulated with the line source replaced with a coaxial probe. The designed NFPs and the corresponding coaxial probes are placed between two horizontal metallic plates of a parallel plate waveguide which are at z=0 and z=H=15 mm planes. The inner and outer conductors of the coaxial probe are connected to the upper and lower plates of the parallel plate waveguide. The inner and outer radii of the probe are 0.635 mm and 2.05 mm, respectively. With this arrangement, an NFP can confine the near-field of the coaxial probe to a unidirectional subwavelength focal pattern. As a result, any object placed at the focal plane significantly alters the near-field formed by the NFP. This change can be detected by examining the reflection coefficient of the coaxial probe.

Figure 5A:
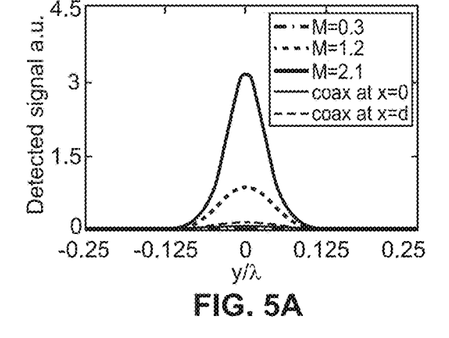
FIGS. 5A-5F illustrate plots of the signals detected by the simulation of a coaxial probe with and without NFPs as metallic cylinders are moved along the focal plane.
Figure 5B:
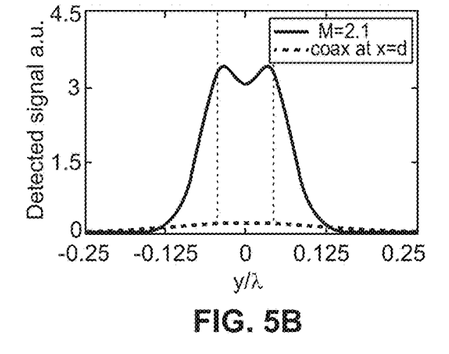
Figure 5C:
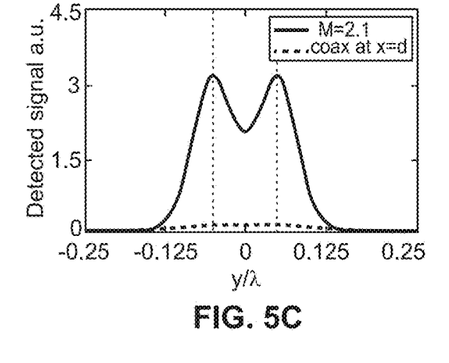
Figure 5D:
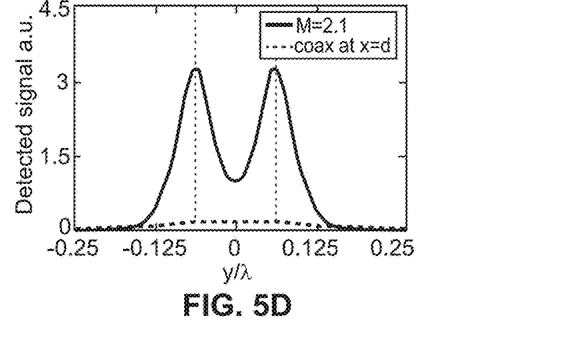
Figure 5E:
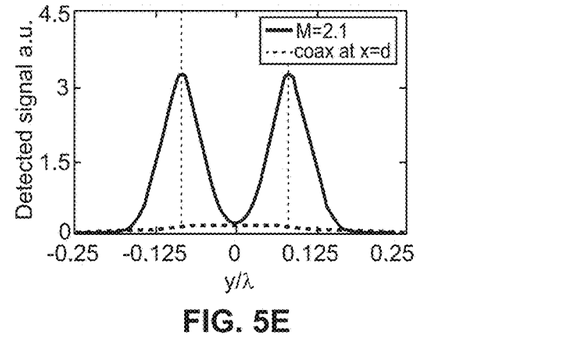
Figure 5F:
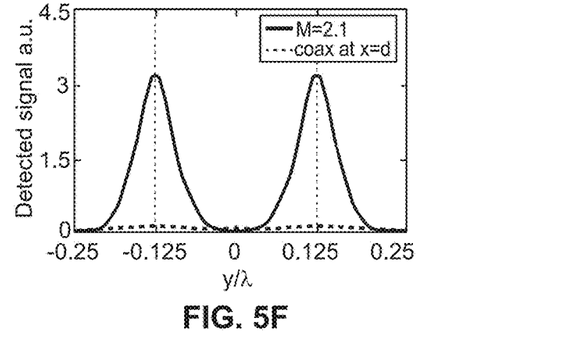
Figure 6A:
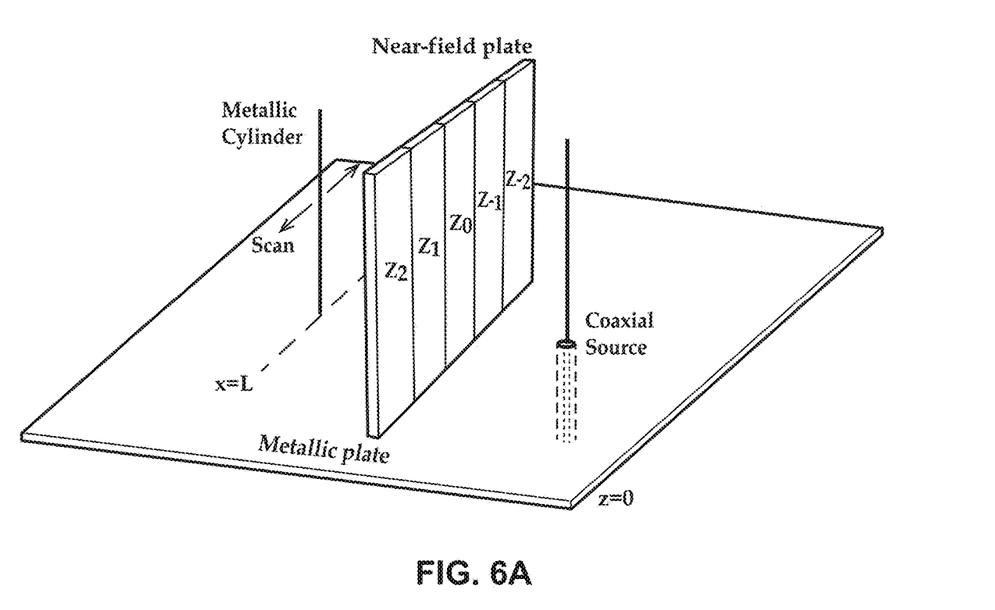
FIGS. 6A and 6B illustrate configurations used in the simulation of a coaxial probe with NFPs as metallic cylinders are moved along the focal plane.

To verify this proposition, the designed NFPs listed in Table 1 are simulated when a metallic cylinder of radius 0.635 mm=0.002λ is placed along their focal plane (see FIG. 6A for simulation configuration). The metallic cylinder is moved along the focal plane and the reflection coefficient, $\Gamma^{cyl}$ is recorded. The reflection coefficient without the metallic cylinder, $\Gamma^0$ is also recorded. The change in reflection coefficient is then enhanced by computing the expression $(\Gamma^{cyl}-\Gamma^0)/(1-\Gamma^{cyl}\Gamma^0)$ as shown by L. Markley and G. Eleftheriades, J. Appl Phys., 107, 093102, 2010. Signals detected in this manner are shown in FIG. 5.

FIG. 5A plots the signal detected by the coaxial probe alone and in the presence of the designed NFPs listed in Table 1. The signal detected by the coaxial probe alone when it is moved to the location of the NFP (x=d) is also depicted. The results show that using a unidirectional NFP allows detection of the subwavelength metallic cylinder, while the coaxial probe can barely detect the metallic cylinder, even when it is moved to the location of the NFP. FIG. 5A also reveals that increasing the amplification factor, M, increases the sensitivity of the near-field probe. This can be expected because a larger amplification factor results in a larger field amplitude at the focal plane. The metallic cylinder causes a larger perturbation in a larger field amplitude, and thus leads to a higher sensitivity.

Figure 6B:
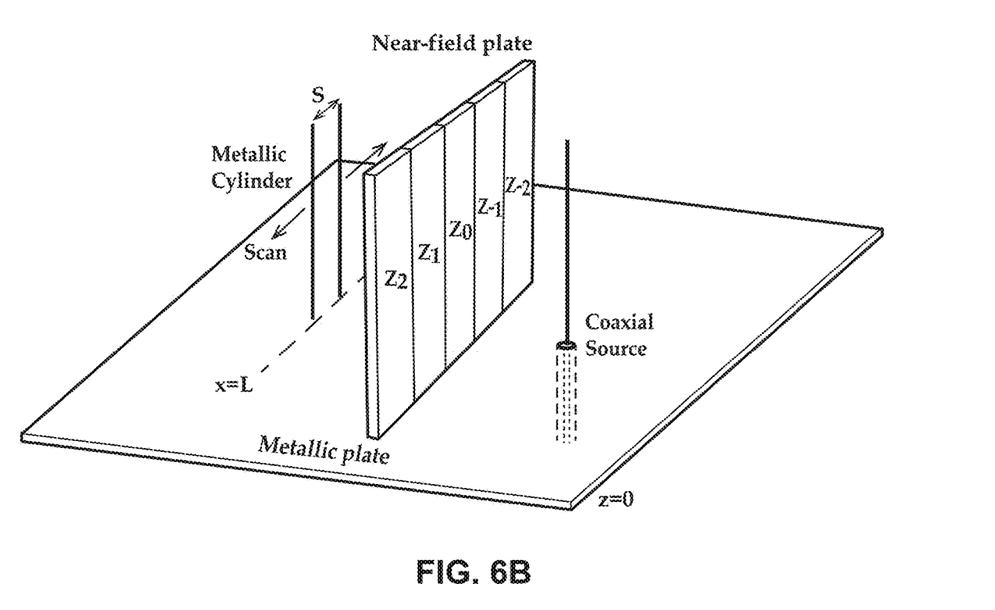

To examine the resolution of the probe based on the unidirectional NFP, two identical metallic cylinders (with radius of 0.635 mm), separated by a distance s, are placed along the focal plane (see FIG. 6B for simulation configuration). Here, only the NFP with M=2.1, which exhibits the highest sensitivity in FIG. 5A, is studied. The two cylinders are moved along the focal plane and the changes in the reflection coefficient are recorded. The signal detected in this manner for various distances s are plotted in FIG. 5B to FIG. 5E, which clearly illustrates the capability of the unidirectional NFP in resolving two subwavelength cylinders which are subwavelength distance apart. Without the unidirectional NFP, the coaxial probe barely distinguishes between the two metallic cylinders, even though the probe has been moved to the location of the NFP. The unidirectional NFP probe described above holds promise for high resolution, highly sensitive probing.

In addition to applications in imaging and probing systems, the designed NFPs may find application in biomedical devices, where the unidirectional subwavelength focus created by the NFPs can be used to develop accurate targeting and stimulating devices. In high density data storage, the designed NFPs can be advantageous in increasing the density of data storage due to their confined focus with suppressed field in other directions. In wireless power transfer systems, the designed NFPs can be used to maintain power transmission to a receiver without radiating in unwanted directions. This can significantly reduce power leakage, interference, and health concerns.

More particularly, in an application involving wireless power transfer, a unidirectional NFP can be placed close to the transmitting loop of a wireless power transfer system to yield a unidirectional wireless power transfer transmitter. In doing so, the unidirectional NFP can significantly reduce the radiation due to the transmitting loop into unwanted directions. This is different from current wireless power transfer systems where a ferrite slab is usually used to reduce the power transmission into unwanted directions. Ferrites are heavy, expensive, lossy and are not eco-friendly to produce. On the other hand, the unidirectional NFP is straightforward to fabricate and low cost, and can form unidirectional near-field patterns with minimal loss. Moreover, these advantages can occur in a single, unitary structural design without the need for additional radiation blocking elements. Further, because the unidirectional NFP and the transmitting loop are out of phase, their combined far-field radiation is much smaller than the field due to the transmitting loop alone. Still further, the unidirectional NFP can form a unidirectional near-field pattern with minimal effect on the efficiency of the wireless power transfer system.

Figure 7:
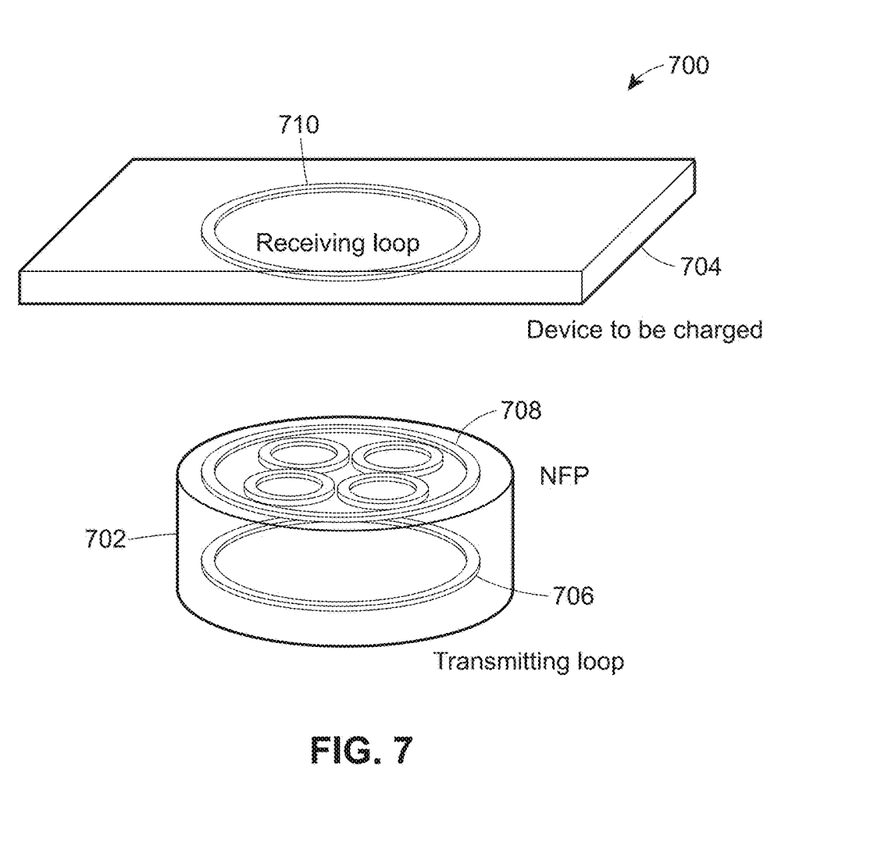
FIG. 7 illustrates a conceptual wireless power transfer system using unidirectional NFPs.

FIG. 7 illustrates an example wireless power transfer system 700 that uses a unidirectional NFP. The example wireless power transfer system 700 includes a charger 702 and a device 704 to be charged (e.g., a computer, a smartphone, a biometric sensor device, a chargeable battery, an automobile using a chargeable battery, etc.). The charger 702 includes a transmitting loop 706 and a unidirectional NFP 708. The unidirectional NFP 708 can control the radiation pattern emitted by the transmitting loop 706. For example, the magnetic field pattern in a desired upward direction (e.g., the normal direction) is enhanced, while the magnetic field radiation pattern in other unwanted directions (e.g., lateral directions) is reduced. Thus, by connecting the device 704 to a receiving loop 710, power can be efficiently transferred to the device 704 without the magnetic field interfering with other electronic devices, or causing health concerns in unwanted directions.

In the embodiment of FIG. 7, the transmitting loop 706, the unidirectional NFP 708 and the receiving loop 710 are all circular. However, in other embodiments, other shapes may be used (including in array form), such as ellipses, squares, triangles, and irregular and asymmetrical shapes. While the axes of the loops are shown to be perpendicular to the NFP in FIG. 7, in other embodiments, the axes of the constituent loops may be arranged perpendicularly and/or in-plane with respect to the surface of the NFP. The transmitting loop 706, the unidirectional NFP 708 and the receiving loop 710 may be made out of copper or other suitable conductive material.

The unidirectional NFP 708 is configured to comprise an array of loops, each of which is loaded with a designed impedance to form a desired unidirectional near-field. There are several factors that affect the choice for the number of loops in the NFP loop array 708. From a design point of view, a higher number of loops may be desired because increasing the number of loops increases the range of the near-field patterns that can be produced (more degrees of freedom). However, considering the wireless power transfer application, it may be desirable to keep losses as low as possible. Thus a trade-off may be evaluated because introducing a new loop may in fact increase the losses due to the added ohmic loss in the copper. In the embodiment of FIG. 7, the NFP loop array 708 is shown to include a large central loaded loop in addition to four identical smaller loops, which have identical loading impedances. The four smaller loops in the NFP loop array 708 are uniformly placed to keep the produced near-field pattern symmetric. It should be noted, however, that this is not the only configuration possible for the unidirectional NFP 708. In other embodiments or scenarios, a higher number of loops in the NFP loop array 708 may be more practical.

Further, the radius of the large central loaded loop is selected to be similar to the transmitting loop 706. The radiuses of the four smaller loops are selected to fit inside the central loaded loop in order to maintain high mutual coupling. In other embodiments or scenarios, the radiuses of the smaller loops may be chosen to be smaller or bigger. Importantly, the loading impedances of the NFP loop array 708 may be designed such that the required currents are induced on the NFP loop array 708 to form the desired unidirectional near-field pattern. The loading impedances may be realized by using lumped element impedances or distributed impedances (e.g., transmission lines).

As shown in FIG. 7, the unidirectional NFP 708 is placed at the top portion of charger 702 while the transmitting loop 706 is situated at the bottom portion of the charger 702. The distance between the transmitting loop 706 and the unidirectional NFP 708 is used to obtain the necessary asymmetry to produce the desired unidirectional field pattern. As discussed earlier, the current on the transmitting loop 706 and the unidirectional NFP 708 should be out of phase in order to form the unidirectional field pattern. If the transmitting loop 706 and the unidirectional NFP 708 are too close to one another or on the same plane, then they would (almost) cancel each other's fields. Accordingly, the field received at the receiving loop 710 would be very low, resulting in low power transfer efficiency. By increasing the distance between the transmitting loop 706 and the unidirectional NFP 708, the field received at the receiving loop 710 can increase and thus result in high power transfer efficiency. This is in fact an advantage of using a unidirectional NFP for wireless power transfer applications. The unidirectional NFP can be used to form a high amplitude and highly confined electromagnetic field in the near-field, while reducing the field in unwanted directions as well as in the far-field. In wireless power transfer systems, high amplitude electromagnetic fields that are formed in unwanted directions (i.e., power leakage) can cause health concerns, interfere with other electronic devices, or hinder metering. The unidirectional NFP 708 significantly mitigates power leakage, while maintaining high power transfer efficiency. Of course, it should be noted that for practical considerations, the distance between the transmitting loop 706 and the unidirectional NFP 708 should be small so as to reduce the overall dimension of the charger 702.

In an embodiment, the wireless power transfer system 700 may be used to charge any suitable computing device such as a laptop computer, a smartphone, a personal digital assistant, a tablet computer, etc. In another embodiment, the wireless power transfer system 700 may be used to charge various biometric sensor devices such as a fingerprint sensor, a heart rate sensor, ventricular assist device, implantable wireless device, an iris scanner, etc. In yet another embodiment, the wireless power transfer system 700 may be used to charge any type of chargeable or rechargeable battery. In still another embodiment, the wireless power transfer system 700 may be used to charge any device or piece of equipment that uses a chargeable or rechargeable battery such as an electric car, an electric motorcycle, an electric bus, an electric boat, etc.

Overall, compared to many competing technologies, such as metamaterial superlenses, the unidirectional NFPs disclosed herein are superior due to their unidirectionality, support for the stipulation of the subwavelength near-field pattern, simplified fabrication, and improved performance.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding; and no unnecessary limitations should be understood therefrom, as modifications within the scope of the invention may be apparent to those having ordinary skill in the art.

What is claimed:

1. A method for unidirectional subwavelength focusing and near-field manipulation using near-field plates, the method comprising:
   generating a source field pattern from an excitation source at a focal plane;
   generating a subwavelength field pattern from a near-field plate when the near-field plate is excited by the excitation source, the near-field plate being at a distance, d, from the excitation source;
   forming a desired field pattern at the focal plane from the subwavelength field pattern and the source field pattern, the focal plane being at a distance, L, from the excitation source; and
   configuring the desired field pattern to be a unidirectional subwavelength field pattern in a desired direction by increasing the amplitude of the desired field pattern in the desired direction.

2. The method of claim 1, wherein increasing the amplitude of the desired field pattern includes varying an amplification factor that affects the field strength.

3. The method of claim 1, wherein increasing the amplitude of the desired field pattern at the focal plane is based on combining the subwavelength field pattern and the source field pattern such that the subwavelength field pattern interferes constructively with the source field pattern in the desired direction while destructively in other undesired directions.

4. The method of claim 1, further comprising forming the near-field plate as a plurality of non-periodically modulated surface impedance elements.

5. The method of claim 4, wherein the plurality of non-periodically modulated surface impedance elements is formed using subwavelength metallic or dielectric patterning.

6. The method of claim 1, wherein d is less than L.

7. The method of claim 1, wherein the excitation source is an elementary electromagnetic source.

8. The method of claim 7, wherein the excitation source induces currents on the near-field plate.

9. The method of claim 8, wherein configuring the desired field pattern to form the unidirectional subwavelength field pattern in the desired direction includes matching the magnitude of the sum of the currents induced on the near-field plate to be close to the magnitude of the current source, and to have nearly opposite phase.

10. The method of claim 1, wherein the excitation source is a probe in an imaging system, and the method further comprising:
    disturbing the unidirectional subwavelength field pattern by placing one or more objects at the focal plane; and
    measuring changes in the unidirectional subwavelength field pattern by examining the input impedance of the probe to detect the presence of the one or more objects.

11. The method of claim 1, wherein the excitation source is a transmitting loop in a wireless power transfer system, and the method further comprising forming the unidirectional subwavelength field pattern in the desired direction for power transmission from the transmitting loop to a receiving loop, wherein a device is placed near the receiving loop to receive power transmitted by the transmitting loop.

12. The method of claim 11, wherein the transmitting loop and near-field plate form a unidirectional field that illuminates the receiving loop.

13. The method of claim 12, wherein the near-field plate comprises an arrangement of loops with loading impedances to form the unidirectional subwavelength field pattern, wherein the axes of the loops in the arrangement of loops are arranged perpendicularly or in-plane with respect to the surface of the near-field plate.

14. The method of claim 11, wherein the device includes one or more of a computer, a smartphone, a biometric sensor device, a chargeable battery, or an automobile using a chargeable battery.

15. An apparatus for unidirectional subwavelength near-field focusing, the apparatus comprising:
    an excitation source generating a source field pattern; and
    a near-field plate generating a subwavelength field pattern when excited by the excitation source;
    wherein after traversing a near-field distance, L, the source field pattern and the subwavelength field pattern form a desired field pattern at a focal plane, wherein the desired field pattern is a unidirectional subwavelength field pattern when the amplitude of the subwavelength field pattern is increased.

16. The apparatus of claim 15, wherein the apparatus is configured to have an amplification factor that produces the unidirectional subwavelength field pattern.

17. The apparatus of claim 15, wherein the excitation source and the near-field plate are configured to combine the subwavelength field pattern and the source field pattern such that the subwavelength field pattern interferes constructively with the source field pattern in the desired direction, while destructively in other undesired directions.

18. The apparatus of claim 15, wherein the near-field plate comprises a plurality of non-periodically modulated surface impedance elements.

19. The apparatus of claim 18, wherein the plurality of non-periodically modulated surface impedance elements have a subwavelength metallic patterning or subwavelength dielectric patterning.

20. The apparatus of claim 15, wherein the excitation source is an elementary electromagnetic source.

21. The apparatus of claim 15, wherein the excitation source induces currents on the near-field plate.

22. The apparatus of claim 21, wherein the excitation source and the near-field plate are configured to form the unidirectional subwavelength field pattern in the desired direction is by matching the magnitude of the sum of the currents induced on the near-field plate to be close to the magnitude of the current source, and having an opposite phase.

23. The apparatus of claim 15, wherein the excitation source is a transmitting loop in a wireless power transfer system, and wherein the unidirectional subwavelength field pattern in the desired direction is formed for power transmission from the transmitting loop to a receiving loop, wherein a device is placed near the receiving loop to receive power transmitted by the transmitting loop.

24. The apparatus of claim 23, wherein the transmitting loop and near-field plate are configured to form a unidirectional field for the receiving loop.

25. The apparatus of claim 24, wherein the near-field plate comprises an arrangement of loops with loading impedances to form the unidirectional subwavelength field pattern, wherein the axes of the loops in the arrangement of loops are arranged perpendicularly or in-plane with respect to the surface of the near-field plate.

26. The apparatus of claim 23, wherein the device includes one or more of a computer, a smartphone, a biometric sensor device, a chargeable battery, or an automobile using a chargeable battery.

* * * * *

UNITED STATES PATENT AND TRADEMARK OFFICE
CERTIFICATE OF CORRECTION

PATENT NO.         : 10,114,120 B2
APPLICATION NO.    : 14/687874
DATED              : October 30, 2018
INVENTOR(S)        : Anthony Grbic et al.

Page 1 of 1

It is certified that error appears in the above-identified patent and that said Letters Patent is hereby corrected as shown below:

In the Claims

At Column 12, Line 59, "is by" should be -- by --.

Signed and Sealed this
Twenty-sixth Day of March, 2019

Andrei Iancu
*Director of the United States Patent and Trademark Office*